United States Patent [19]

Liaw et al.

[11] Patent Number: 5,755,913

[45] Date of Patent: May 26, 1998

[54] ADHESIVE-FREE ADHESION BETWEEN POLYMER SURFACES

[76] Inventors: Der-Jang Liaw; Ching-Cheng Huang, both of Department of Chemical Engineering National Taiwan Institute of Technology, Taipei, Taiwan; En-Tang Kang; Kuang Lee Tan, both of Department of Chemical Engineering, National University of Singapore, Kent Ridge, Singapore, 119260; Koon Gee Neoh, Department of Chemical Engineering, National University of Singapore, Kent Ridge, Singapore, 119260

[21] Appl. No.: 761,122

[22] Filed: Dec. 6, 1996

[51] Int. Cl.$^6$ .................................................. B32B 31/00
[52] U.S. Cl. ..................... 156/272.6; 156/273.3; 156/275.5; 156/308.6; 156/309.3; 156/310
[58] Field of Search .................... 156/308.6, 309.3, 156/310, 314, 305, 272.6, 273.3, 275.5; 428/420

[56] References Cited

U.S. PATENT DOCUMENTS 5,135,598  8/1992  Kobe et al. ........................ 156/273.3
5,308,428  5/1994  Simpson et al. ...................... 156/272.6

OTHER PUBLICATIONS

CA 122: 135918p "Surface photografting: new application to synthetic fibers", 1994.

*Primary Examiner*—Michael W. Ball
*Assistant Examiner*—Michael A. Tolin
*Attorney, Agent, or Firm*—Fish & Richardson P.C.

[57] ABSTRACT

The present invention is directed to a process for imparting adhesive-free adhesion characteristics (i) between two polymer films, (ii) between a polymer film and a polymer fiber, and (iii) between the surface of a polymer fiber or film and a polymer matrix. The adhesive-free adhesion properties of the polymer film and fiber surfaces are introduced through a method for modification of a pre-activated polymer surface via near-UV-light induced or thermally-induced surface graft copolymerization with a functional monomer. The adhesive-free adhesion may be a result of dispersive interaction, chain entanglement, electrostatic interaction, ionic interaction, acid/base interaction, H-bonding and/or covalent bonding of the resulting grafted functional polymer(s) at the interface, or of the resulting grafted functional polymer and the polymer matrix.

35 Claims, No Drawings

ADHESIVE-FREE ADHESION BETWEEN POLYMER SURFACES

BACKGROUND OF THE INVENTION

1. Field of the Invention

The present invention relates to adhesive-free adhesion between two polymer films; a polymer film and a polymer fiber; and a polymer film or fiber and a polymer matrix. In particular, the adhesive-free adhesion is brought about by modification of the polymer film and polymer fiber via a surface graft copolymerization with a functional monomer.

2. Description of the Related Art

Often, the selected polymer has surface characteristics that are less than optimum for the intended application. This is particularly true in the case of adhesion involving polymer surfaces. To correct this, the strategies of surface chemical modification have been widely implemented. They have been described in great detail, for example, in S. Wu, *Polymer Interfaces and Adhesion*, Dekker, New York (1982); Y. Ikada and Y. Uyama, *Lubricating Polymer Surfaces*, Technomics Pub. Co. Inc., Lancaster, PA (1993); K. L. Mittal, (Ed.) *Polymer Surface Modification: Relevance to Adhesion*, VSP, Zeist, The Netherland (1995); L. S. Penn and H. Wang, *Polymers for Advanced Technologies*, 5, 809–817 (1994); and E. T. Kang, K. G. Neoh, K.L. Tan, F. C. Loh and D. J. Liaw, *Polymers for Advanced Technologies*, 5, 837–842 (1994).

A variety of techniques are useful for chemical modification of polymer surfaces for improved adhesion. These techniques include acid etching, X-ray irradiation, ultraviolet irradiation, electron beam bombardment, ozone treatment, corona discharge and plasma treatment. The last technique has been described in great detail, for example, in M. Strobel, C. S. Lyons and K. L. Mittal, (Eds.) *Plasma Surface Modification of Polymers: Relevance to Adhesion*, VSP, Zeist, The Netherlands (1994). A variety of polar and functional groups are generated on the polymer surface as a result of these treatments. One of the major drawbacks of these treatments is that the physicochemical characteristics of the modified polymer surfaces, including surface compositions, are time-dependent. Chain and polar group reorientation in the surface region can result in gradual deterioration of the surface reactivity. Furthermore, as the polar and functional groups generated on the polymer surfaces by these methods are generally of micro molecular in nature and are generally restricted to a few surface molecular layer, adhesion between two modified polymer surfaces is promoted only in the presence of an externally applied adhesive.

The patent literature is flooded with claims of surface modifications of polymers for adhesion enhancement. Our specific patent search for adhesive-free adhesion or self-adhering polymer films and fibers arising from surface graft copolymerization did not reveal any similar claims or reports. Some cases and claims of interest are summarized below.

In Japan Patent JP 7-101,017A, Apr. 18, 1995, an easy adhesive resin layer is prepared to make a polyester film useful for a magnetic recording medium.

In Japan Patent JP 7-216,319A, Aug. 15, 1995 a self-adhesive sheet, having adhesive layer composed of elastomer, tackifier resin, softener and incompatible macromolecular compound, has been claimed.

In German Patent DE 4,410,558 A1, Sep. 28, 1995, Malleable, multi-layered, self-adhesive screening sheet or strip to carry conductors; and pipes which screens electromagnetic field and radiation for use as a conduit system have been prepared.

In Japan Patent JP 7-216,322A, Aug. 15, 1995, in the production of a self-adhesive non-vulcanized rubber sheet or tape by laminating a self-adhesive non-vulcanized rubber on a surface material, the surface material is temporarily bonded to a release paper and then a self-adhesive rubber is laminated on it, followed by winding of the laminate into roll.

In Japan Patent JP 7-216,315A, Aug. 15, 1995, self-adhesive film leaving no residue on substrate is prepared by forming a thin metal layer on supporting film made from, for example, polyolefin and self-adhesive layer on other side of the supporting film.

In Japan Patent JP 7-188,634A, Jul. 25, 1995, a one pack curable epoxy resin self-adhesive for self-adhesive tape, comprising of epoxy resin, ketimine, modified silicone resin, catalyst for modified silicone resin, and tack improver, has been prepared.

In World Patent WO 9,411,421, May 26, 1994; and European Patent EP 667,879, Aug. 23, 1995, modification of polymer-based surfaces by coating with particles is affected without the use of an adhesive by converting the surface top layer to a swollen or semi-dissolved state and simultaneously or subsequently contacting it with the particles.

In European Patent EP 358,519A, Mar. 24, 1990; Japan Patent JP 2 073,828A, Mar. 13, 1990; Japan Patent JP 2-245,033A, Sep. 28, 1990; U.S. Pat. No. 5,049,626, Sep. 17, 1991; European Patent EP 358,519A3, Mar. 18, 1992; and U.S. Pat. No. 5,300,548, Apr. 5, 1994, a graft copolymer comprises a stock copolymer of monomers from esters of unsaturated carboxylic acids and vinyl esters, ethylene, and CO, and a polyamide oligomer having a primary amino group at one end of its molecule grafted on the stock has been claimed.

In Japan Patent JP 4-370,107A, Dec. 22, 1992, a modified copolyester is obtained by polymerising an unsaturated monomer bearing no hydrophilic groups in medium in the presence of a copolyester bearing no substituents of sulfonic acid derivatives. Also claimed are easily adhesive polyester films obtained by applying aqueous solution of the modified copolyester on at least one side of a polyester film.

In German Patent DE 3,602,800A, Dec. 11, 1986; European Patent, EP 204,943A, Dec. 17, 1986; U.S. Pat. No. 4,740,562, Apr. 26, 1988; and German Patent DE 3,602,800C, surface of polyvinylidene fluoride articles is modified by de-hydrofluorination, by etching with base, solvent or swelling agent and homogenising agent, to improve adhesion and hydrophilicity.

SUMMARY OF THE INVENTION

It is an object of the present invention to provide a method for imparting adhesive-free adhesion characteristics onto the surfaces between two contacting polymer surfaces.

It is another object of the present invention to provide a method which allows the adhesion between two polymer films in the absence of an applied adhesive. The adhesion strength in the form of lap shear strength between any two polymer thin films can readily exceed the yield strength of the polymer films.

It is further another object of the present invention to provide a method which allows the adhesion between a polymer film and a polymer fiber in the absence of an applied adhesive.

In accordance with the present invention the adhesive-free adhesion can be imparted on all polymer films, including polyolefin, polyester, hydrocarbon and fluoropolymer films, electroactive (conductive) or conjugated polymer films, as well as on thermoset films. The preferred application and the best advantages of the present invention are obtained from flexible thermal plastic films.

Another advantage of the present invention is that the adhesive-free adhesion characteristics are not limited to two similar or identical polymer substrates, but are also obtained between polymer films with vastly different physicochemical properties and compositions, such as between a fluoropolymer film and a polyolefin film.

These and other objects and advantages of the present invention are obtained by providing first a method for modifying the surfaces of polymer films or fiber. The preferred method is via thermally or near-UV-light induced surface graft copolymerization of the pre-activated substrate surfaces with a functional monomer.

The polymer substrate is preferably pre-activated by treating with plasma, ozone, corona discharge, UV-irradiation or a means so that peroxide or hydroxyl peroxide species are formed on a surface of the polymer substrate followed by immersing the pre-activated polymer substrate in an aqueous solution, an organic solution or an emulsion containing the functional monomer, and the resulting mixture is subjected to a heat or a near-UV-light irradiation to induce the surface graft copolymerization.

The objects and advantages of the present invention are realized when two surface modified polymer films, or surface modified film and fiber, are brought into intimate contact with each other under load and in the presence of a small amount of water or solvent for the grafted polymer(s). The interfacial adhesion strength is fully developed when the solvent dries or evaporates.

The objects and advantages of the present invention are achieved when the grafted polymer chains from the two lapped films, or film and fiber, undergo diffusion and entanglement, inductive and dispersive interactions, ionic and electrostatic interactions, H-bonding, and/or covalent bonding at the interface. In the presence of sufficient ionic or electrostatic interaction, respectable adhesion strength are also observed between the lapped junction in an aqueous medium.

The monomers for the surface graft copolymerization are selected from a family of vinyl monomers which readily under free-radical initiated polymerization. Desirably, the monomers are selected from the group containing polar, cationic, anionic, amphoteric or electrolyte functional groups.

More particularly, said functional monomers are selected from the family of water-soluble or hydrophilic monomers. This selection allows the objects and advantages of the present invention to be achieved using water as the solvent medium for surface modification and subsequent interfacial adhesion, thus eliminating the use of expensive and environmentally hazardous organic solvents commonly found in commercial adhesives.

The monomers used thereof may be selected from the families of acrylic acid-based monomers, acrylamide and acrylate monomers, sulfonic acid-containing monomers, electrolyte and amphoteric monomers, glycidyl or epoxide group-containing monomers, and amine containing monomers.

The substrate polymer films used thereof may be selected from polyolefins and hydrocarbon polymers, such as, but not limited to, high density polyethylene, low density polyethylene, polystyrene, polypropylene and polycarbonate etc.; polyester films, such as, but not limited to, poly(ethylene terephthalate) etc..; fluoropolymers, such as, but not limited to, polytetrafluoroethylene, poly(vinylidene fluoride), and their copolymers. Thin thermoset films or thin polymer films with thermoset characters, such as, but not limited to, epoxy and polyimide films etc. may also be selected. Conjugated or electroactive polymer films, such as, but not limited to, films of aniline, pyrrole, thiophene, substituted acetylene and phenylene vinylene polymers, and their derivatives and analogs, may also be used as substrates.

The objects and advantages of the present invention are enhanced if the grafted polymer chains at the lapped interface also exhibit ionic bonding, polar interaction, H-bonding and/or bonding through metal chelation. For substrate films with surface graft anion polymer or polymer with anionic groups, such as the carboxylic acid groups, the interfacial adhesions are promoted through the introduction of a divalent or multi-valent salt, such as, but not limited to Zn and Cd salts. The presence of metal ions induces ionic bonding with bonding energies close to those of the covalent bonds. Ionic bondings result in shorter drying time and more rapid development of the adhesion strength.

The objects and advantages of the present invention can also be substantially enhanced if the grafted polymer chains at the lapped interface undergo covalent bonding and cross-linking. More particularly, when one substrate surface of the lapped junction is graft copolymerized with an epoxide-containing monomer, such as, but not limited to, glycidyl methacrylate, while the corresponding (opposite) substrate surface is graft copolymerized with an hydroxyl- or amine-containing monomer, such as, but not limited to, N-(hydroxymethyl) acrylamide, the curing reactions of the epoxide functional groups by the hydroxyl and amine groups readily result in a covalently bonded and cross-linked interfaced with high adhesion strength.

The objects and advantages of the present invention can also be extended to a method for the enhancement of coupling between a polymer film or a polymer fiber and a polymer matrix in the fabrication of a film- or fiber-reinforced resin composite, which comprises: modifying a polymer film or a polymer fiber via surface graft copolymerization with a functional monomer which has a first functional group being able to undergo free-radical initiated polymerization and a second functional group being able to react with a curing agent containing in a liquid resin prior to impregnating said polymer film or said polymer fiber with said liquid resin. Preferably, said liquid resin is epoxy resin, said second functional group is epoxide, and said curing agent is an secondary, tertiary or quaternary amine. Said functional monomer may be glycidyl methacrylate, ally glycidyl ether, or glycidyl functional aromatic monomers; and said polymer fiber may be an aramid fiber, aromatic nylon fiber, ultra-high-modulus polyethylene fiber, carbon fiber or graphite fibe.

Said polymer film or said polymer fiber are pre-activated prior to the surface graft copolymerization by treating with plasma, ozone, corona discharge, UV-irradiation or a means so that peroxide or hydroxyl peroxide species are formed on a surface of said polymer film or said polymer fiber, and then are immersed in an aqueous solution, an organic solution or an emulsion containing the functional monomer, and the resulting mixture is subjected to a heat or a near-UV-light irradiation to induce the surface graft copolymerization.

DESCRIPTION OF PREFERRED EMBODIMENTS

This invention relates to the adhesive-free adhesion between two polymer surfaces when brought into direct contact in the presence of water (or a solvent), and subsequently dried. The property can be imparted on the surface of most polymers, including polyolefins, polyesters, hydrocarbon polymers and fluoropolymers, as well as electroactive (conductive) or conjugated polymers. The adhesive-free adhesion properties of the polymer surfaces are introduced through surface graft copolymerization of the polymer substrates with functional monomers, including, but not limited to, acrylic acid (AAc), acrylamide (AAm), Na salt of styrenesulfonic acid (NaSS), N,N-dimethyl acrylamide (DMAA), N,N-dimethylpropyl acrylamide (DMAPAA), epoxide-containing monomers, hydroxy- or amine-containing monomers, monomers of polyelectrolyte, and monomers of polyampholyte. Adhesive-free adhesion through covalent bonding of the surface grafted epoxide-containing polymer on high-modulus polymer fibers (or on polymer films) to the epoxy matrix in fiber-reinforced (or laminated) composites can also be achieved.

While not wishing to be bound by any theory, it is believed that the present invention is based upon the fact that the introduction of functional polymers, through graft copolymerization, onto the surfaces of existing polymer films or substrates, adhesive-free adhesion characteristics are imparted between two polymer surfaces. Thus, the surface modified polymer thin film or substrate is capable of undergoing adhesive-free adhesion with another similarly modified thin film or substrate (not necessarily of the same material), when brought into intimate contact with one another in the presence of a small amount of solvent for the grafted chains. The adhesion force, as measured by the lap shear strength, is governed by the nature of the interactions between the grafted chains at the lapped junction. The interfacial interactions arise from inductive, dispersive (van der Waals), ionic, covalent, electrostatic and H-bonding forces. In all cases, chain diffusion and entanglement at the lapped junction play an important role in the resulting adhesion strength. The type of interfacial interaction is determined, in term, by the type of functional groups in the surface grafted polymer. The extent of entanglement, on the other hand, depends on the efficiency of surface grafting.

It is well-known in the literature that a number of vinyl monomers are susceptible to near-UV-light or thermally induced radical polymerization. The monomers used in the present invention are chosen from this family of vinyl monomers. The graft copolymerization reactions are initiated by free radicals generated on the substrate surface. Thus, prior to graft copolymerization, the substrate films are pretreated with plasma, ozone, corona discharge and other chemical or physical means to produce a surface coverage of peroxide and hydroxyl peroxide species. The peroxide species are subsequently decomposed thermally or by near-UV-light to initiate the surface graft copolymerization reaction in the presence of the monomer or monomers.

The selection of the types of surface pretreatment for the substrate films prior to surface graft copolymerization is of particular importance. For chemically inert surfaces, such as the surfaces of most fluoropolymer films, the choices of surface pretreatment are limited to plasma and corona discharge treatments. For the polyolefin, polyester, polyimide, polycarbonate and hydrocarbon films, the choice of the surface pretreatment methods is less critical. For conjugated electroactive polymer films, surface graft copolymerization can proceed in the absence of any surface pretreatment.

The selection of the monomer concentrations used for graft copolymerization is not particularly important, although the preferred concentration for most monomers is 10 wt % and above. For lower monomer concentration used, a longer polymerization time may be used to reach the same extent of surface grafting. The extent of surface graft copolymerization, however, has a strong effect on the observed lap shear strength, as the latter is dependent on the degree of chain entanglement and extent of functional group interaction. It may be appropriate to emphasize that a high graft concentration must exist on one side of the film to promote chain diffusion and entanglement, even in the presence of strong electrostatic interactions. The best adhesion results are observed (i) when both chain entanglement and electrostatic interactions coexist and (ii) when covalent bonding or cross-linking occurs between the two lapped surfaces.

With the presence of sufficient chain diffusion and entanglement, electrostatic and/or covalent interactions at the lapped junction, adhesive-free adhesion can be observed between two similar or between two dissimilar substrate films. It should be noted, however, that polymer films of different chemical structure will exhibit different degree of susceptibility towards graft copolymerization with the selected monomers under the same experimental conditions. For respectable adhesion strengths, the number of repeating units of the grafted polymer per repeating unit of the substrate chain should exceed 1.0 in the top 100 of the substrate surface.

For polymer surfaces grafted with anion and cationic polymer chains, substantial and respectable adhesive interactions are also observed between the lapped junction in an aqueous medium, provided that sufficient chain diffusion, entanglement and electrostatic interactions are present at the lapped junction.

EXAMPLES

The following specific examples are provided to illustrate this invention and the manner in which it may be carried out. It will be understood, however, that the specific details given in each example have been selected for purpose of illustration and are not to be construed as a limitation on the invention. In the example, unless otherwise indicated, all parts and percentages are by weight. In Examples 2 to 6, a fixed contact area of 0.5 cm×0.5 cm and a film dimension of 0.5 cm×2 cm were used. Unless stated otherwise, all modified films were obtained from graft copolymerization in 10% monomer solution. Example 1 provides more details on the conduct of the experimental process of surface graft copolymerization with the functional monomers.

Example 1

In a preferred experimental scale process, Ar plasma pretreated, ozone pretreated, or corona discharge pretreated polymer films, or pristine conjugated polymer film, of size 1.5 cm×3.5 cm were immersed in 20 ml of monomer solution in a Pyrex® tube. The concentrations of the monomer were varied from 1 to 50%. The preferred concentration was 10% and above. Each reaction mixture was thoroughly degassed and sealed under a nitrogen atmosphere. It was then subjected to near-UV-light illumination for about 0.5 to 2 hours with a 150 W Xenon arc source. Alternatively, the reaction mixture was placed in a constant temperature bath for 0.5 to 2 hours. The temperatures of the water bath were varied between 65° to 90° C. The reaction time and temperature in all cases were dependent on the nature of the substrate, the reactivity of the monomer, and the graft concentration required. After each grafting experiment, the polymer film was removed from the viscous homopolymer solution and washed with copious amount of the polymerization solvent. It was then subjected to repeated washing and soaking in a continuous stirred water bath for 24 to 72 hours to remove the residual homopolymer. The surface modified film was subsequently dried by pumping under reduced pressure.

Example 2

The water soluble monomer used for graft copolymerization, acrylic acid (AAc), was obtained from Wako Pure Chemical Industries Ltd., Japan. Poly(tetrafluoroethylene) (PTFE) films having a thickness of about 0.01 cm and a density of 2.18 g/cm$^3$ were purchased from Goodfellow Inc. of UK. The surfaces of the films were cleaned by Soxhlet extraction in methanol for 6 h before use. The solvents and other reagents were of analytical grade and were used without further purification.

PTFE films of about 1.5 cm×3.5 cm were pretreated with Ar plasma before graft copolymerization. A bell-jar-type glow discharge cell, Model LVCD 12, manufactured by Shimadzu Corp. of Kyoto, Japan was used for the plasma treatment. The frequency applied was 5 kHz at a plasma power of 28 W (280 V and 100 mA). The films were fixed on a stainless steel sample holder rotating between two flat plate electrodes. The electrode separation was about 8.0 cm. The pressure in the bell-jar was maintained at about 0.04 Torr of Ar when the polymer films were subjected to glow discharge for 5 to 40 s. The Ar plasma pretreated films were exposed to the atmosphere before the graft copolymerization experiment.

Each PTFE film was immersed in 20 ml of aqueous monomer solution in a Pyrex tube. The concentration of the AAc solutions were varied from 1 to 10 wt. %. Each reaction mixture was thoroughly degassed and sealed under a nitrogen atmosphere. It was then subjected to near-UV irradiation (wavelength>290 nm) for about 30 min in a rotary photochemical reactor equipped with a 1000 W high pressure Hg lamp (Riko Rotary Model RH400-10W). After each grafting experiment, the PTFE film was removed from the viscous homopolymer solution and washed with a jet of doubly distilled water. It was then immersed in a 60° C. water bath with continuous stirring for 24 h, followed by rinsing with copious amounts of distilled water, to remove the residual homopolymer.

Two similar acrylic acid graft copolymerized polytetrafluoroethylene (PTFE) films were brought into intimate contact with one another under load and in the presence of water. The development of the adhesion strength depended on the adhesion (drying) time of the lapped interface. The lap shear strength increased monotonically with adhesion time. With adhesion time greater than 300 min, the adhesion force between the films becomes so strong that the lap shear strengths for all film pairs, prepared from graft copolymerization in 1 to 10% acrylic acid solution, exceeded the tensile yield strength of the 0.1 mm thick polytetrafluoroethylene film used.

Example 3

The water soluble monomer used for graft copolymerization, N,N-dimethylacrylamide (DMAA), was obtained from Wako Pure Chemical Industries Ltd., Japan. Poly(tetrafluoroethylene) (PTFE) films were purchased and treated the same as in Example 2.

Similar procedures were used for the plasma pretreatment of PTFE films and graft copolymerization with DMAA, except the degassing process was replaced by the use of 5 ml of 0.05 mM riboflavin. In this case, the dissolved oxygen, which could inhibit the radical polymerization, was consumed by photochemical reaction with riboflavin. Both the degassing and the riboflavin addition processes produce DMAA graft copolymerized PTFE films of similar quality, as revealed by the X-ray photoelectron spectroscopic (XPS) results.

An AAc graft copolymerized polytetrafluoroethylene film as prepared in Example 2 and a DMAA graft copolymerized polytetrafluoroethylene film were brought into intimate contact with one another under load and in the presence of water. Strong adhesion with lap shear strength reaching that of the yield strength of the 0.1 mm thick substrate was again observed. Increasing the extent of electrostatic (ionic interaction) interaction, caused by a higher degree of surface graft copolymerization at larger plasma pretreatment time, resulted in a uniform increase in lap shear strength across all the adhesion time.

Example 4

In another preferred adhesive-free adhesion experiment, two similar acrylic acid graft copolymerized low density polyethylene (LDPE) films, or two similar N,N-dimethylacrylamide graft copolymerized LDPE films, or an acrylic acid graft copolymerized LDPE film and a N,N-dimethylacrylamide graft copolymerized LDPE film were brought into intimate contact under load and in the presence of water. For the lapped 'hetero-junction' involving both grafted acrylic acid polymer and N,N-dimethylacrylamide polymer, the presence of electrostatic (ionic) interaction results in the rapid development of the interfacial adhesion, even when the lapped junction was still 'wet'. In all cases, the lap shear adhesion strengths readily exceeded the tensile yield strength of the 0.125 mm thick LDPE film used.

Example 5

In another preferred adhesive-free adhesion experiment, two similar acrylic acid graft copolymerized LDPE films were brought into intimate contact under load and in the presence of a small quantity of 10% aqueous $ZnCl_2$ solution. In comparison with the adhesion strength of the lapped junction in the absence of the salt, $ZnCl_2$ addition resulted in the more rapid development of the interfacial adhesion strength, as Zn ions promote the formation of intermolecular ionic bonds among the grafted chains from the two surfaces. Cd and other divalent and multi-valent ionic salts produced similar effects. Bonds formed with monovalent salts showed correspondingly lower bonding energies.

Example 6

In this preferred adhesive-free adhesion experiment, adhesion between two chemically different polymer substrates was achieved. Lap shear adhesion strength in excess of the tensile yield strengths of both substrate films readily developed between an acrylic acid graft-copolymerized LDPE film and an acrylic acid graft-copolymerized PTFE film, between an acrylic acid graft-copolymerized LDPE film and a N,N-dimethylacrylamide graft-copolymerized PTFE film, and between a N,N-dimethylacrylamide graft-copolymerized LDPE film and acrylic acid graft-copolymerized PTFE film. For the latter two interfaces, electrostatic (ionic) interaction was also operative.

Example 7

In this preferred adhesive-free adhesion experiment, two polycarbonate films with surface grafted amphoteric polymers, such as 3-dimethyl(methacryloyl ethyl) ammonium propane sulfonate (DMAPS) polymer, were brought into intimate contact in the presence water and under load. The interfacial adhesion was substantially enhanced by the simultaneous presence of cationic and anionic functional groups on the same grafted chain at each surface. The lap shear strength between two DMAPS graft copolymerized polycarbonate film (in excess of 100 N/cm$^2$) was significantly higher than that of the tensile yield strength of the substrate film, or than that between two cationic polymer grafted surfaces, or between two anionic polymer grafted surfaces (about 50 N/cm$^2$) and was comparable to that between an anionic polymer (acrylic acid polymer) grafted surface and a cationic polymer (N,N-dimethylacrylamide) grafted surface.

Example 8

In yet another preferred adhesive-free adhesion experiment, two electroactive polyaniline films (in the emeraldine base form) with surface grafted DMAPS polymer, or a DMAPS graft copolymerized polyaniline film and an acrylic acid graft copolymerized polytetrafluoroethylene film, were brought into intimate contact in the presence of water and under load. The polyaniline films were not subjected to any surface pretreatment prior to the graft copolymerization. Strong lap shear adhesions were again observed at the two types of interface involving the electroactive conjugated polymer. The lap shear adhesion strengths for the two respective junctions were in excess of 330 N/cm$^2$ and 100 N/cm$^2$.

Example 9

In yet another preferred adhesive-free adhesion experiment, a polytetrafluoroethylene film with surface grafted glycidyl methacrylate polymer was lapped together with another polytetrafluoroethylene film with surface grafted N-(hydroxylmethyl) acrylamide polymer. The interfacial epoxy curing reaction readily resulted in lap shear adhesion in excess of 120 N/cm$^2$.

Example 10

In yet another preferred adhesive-free adhesion experiment, ultra-high-modulus polyethylene fibers with surface grafted glycidyl methacrylate (GMA) polymer exhibited a minimum of three-fold increase in microdebonding strength over the pristine (ungrafted) fibers in the epoxy matrix of the fiber-reinforced composites. The enhanced interfacial adhesion was attributed to the covalent bonding of the epoxide groups of the grafted GMA polymer to the amines in the curing agent of the epoxy resin matrix.

To those skilled in the art to which this invention relates, many changes in construction and widely differing embodiments and applications of the invention will suggest themselves without departing from the spirit and scope of the invention. The disclosures and the descriptions herein are purely illustrative and are not intended to be in any sense limiting.

We claim:

1. A method for imparting adhesion between two polymer substrates comprising the following steps:
  a) modifying a surface of a first polymer substrate via surface graft copolymerization with a first functional monomer which is able to undergo free-radical initiated polymerization;
  b) modifying a surface of a second polymer substrate via surface graft copolymerization with a second functional monomer which is able to undergo free-radical initiated polymerization;
  c) bring the modified surface of the first polymer substrate and the modified surface of the second polymer substrate into contact in the presence of an adhesive-free liquid medium; and
  d) maintaining the contact for a period of time until the liquid medium substantially dries.

2. The method according to claim 1, wherein the first polymer substrate is pre-activated prior to the surface graft copolymerization in step a) by treating the first polymer substrate with plasma, ozone, corona discharge, UV-irradiation or a means so that peroxide or hydroxyl peroxide species are formed on the surface of the first polymer substrate.

3. The method according to claim 1, wherein the second polymer substrate is pre-activated prior to the surface graft copolymerization in step b) by treating the second polymer substrate with plasma, ozone, corona discharge, UV-irradiation or a means so that peroxide or hydroxyl peroxide species are formed on the surface of the second polymer substrate.

4. The method according to claim 1, wherein the first polymer substrate is immersed in an aqueous solution, an organic solution or an emulsion containing the first functional monomer, and the resulting mixture is subjected to a heat or a near-UV-light irradiation to induce the surface graft copolymerization.

5. The method according to claim 1, wherein the second polymer substrate is immersed in an aqueous solution, an organic solution or an emulsion containing the second functional monomer, and the resulting mixture is subjected to a heat or a near-UV-light irradiation to induce the surface graft copolymerization.

6. The method according to claim 1, wherein the first polymer substrate is in the form of a film.

7. The method according to claim 6, wherein the second polymer substrate is in the form of a film.

8. The method according to claim 1, wherein the second polymer substrate is in the form of a fiber.

9. The method according to claim 1, wherein said first and second polymer substrates are selected independently from the group consisting of polyolefin and hydrocarbon polymer.

10. The method according to claim 9, wherein said first and second polymer substrates independently are high density polyethylene, low density polyethylene, polypropylene, polystyrene, or polycarbonate.

11. The method according to claim 1, wherein said first and second polymer substrates independently are fluoropolymer or halogen-containing polymer.

12. The method according to claim 11, wherein said first and second polymer substrates independently are polytetrafluoroethylene; copolymer of tetrafluoroethylene and hexafluoropropylene; copolymer of tetrafluoroethylene and perfluoro(propyl vinyl ether); copolymer of tetrafluoroethylene and perfluoro-2,2-dimethyl-1,3-dioxide; copolymer of tetrafluoroethylene and vinyl fluoride; poly(vinyl fluoride); poly(vinylidene fluoride); polychlorotrifluoroethylene; vinyl fluoride/vinylidene fluoride copolymer; vinylidene fluoride/hexafluoroethylene copolymer; poly(vinyl chloride) or poly(vinylidene chloride).

13. The method according to claim 1, wherein said first and second polymer substrates independently are polyester.

14. The method according to claim 13, wherein said first and second polymer substrates independently are poly(ethylene terephthalate).

15. The method according to claim 1, wherein said first and second polymer substrates independently are thermosetter.

11

16. The method according to claim 15, wherein said first and second polymer substrates independently are epoxy polymer, polyimide, polyurethane or phenolic polymer.

17. The method according to claim 1, wherein said first and second polymer substrates independently are electroactive conjugated polymer, and said electroactive conjugated polymer is not subjected to said pre-activation defined in claim 2 prior to said surface graft copolymerization.

18. The method according to claim 17, wherein said first and second polymer substrates independently are aniline, pyrrole, thiophene or acetylene polymers.

19. The method according to claim 1, wherein said first and second functional monomers independently are hydrophilic vinyl monomer.

20. The method according to claim 19, wherein said first and second functional monomers independently are acrylic acid-based monomer, acrylamide monomer, sulfonic acid-containing monomer, or acrylate monomer.

21. The method according to claim 1, wherein said first and second functional monomers are selected independently from the group consisting of electrolyte, Zwitterionic, and amphoteric monomers.

22. The method according to claim 21, wherein said first and second functional monomers independently are dimethyl sulfate quaternized dimethylaminoethyl methacrylate (DMAEM.C$_2$H$_6$SO$_4$), 2-acrylamino-2-methyl-propanesulfonate, 3-dimethyl (methacryloyl ethyl) ammonium propane sulfonate (DMAPS), or 3-dimethyl (acryloyloxy ethyl) ammonium propane sulfonate (DAAPS).

23. The method according to claim 1, wherein said first functional monomer is an epoxide-containing monomer, and said second functional monomer is a monomer containing an epoxy curing functionality.

24. The method according to claim 23, wherein said first functional monomer is glycidyl methacrylate, ally glycidyl ether, or glycidyl functional aromatic monomers; and said

12 second functional monomer is N-(hydroxymethyl) acrylamide or N-butoxymethyl acrylamide.

25. The method according to claim 1, wherein said first and second functional monomers are both hydrophilic monomer.

26. The method according to claim 25, wherein each of said first and second polymer substrates is modified by a grafted hydrophilic polymer.

27. The method according to claim 25, wherein each of said first and second polymer substrates is modified by a grafted anionic polymer.

28. The method according to claim 25, wherein each of said first and second polymer substrates is modified by a grafted cationic polymer.

29. The method according to claim 25, wherein said first polymer substrate is modified by a grafted cationic polymer, while said second polymer substrate is modified by a grafted anionic polymer.

30. The method according to claim 25, wherein each of said first and second polymer substrates is modified by a grafted polyelectrolyte.

31. The method according to claim 25, wherein each of said first and second polymer substrates is modified by a grafted Zwitterionic polymer.

32. The method according to claim 25, wherein each of said first and second polymer substrates is modified by a grafted amphoteric polymer.

33. The method according to claim 25, wherein said first polymer substrate is modified by a grafted amphoteric polymer, while said second polymer substrate is modified either by a grafted cationic polymer or by a grafted anionic polymer.

34. The method according to claim 25, wherein said liquid medium is water.

35. The method according to claim 23, wherein said liquid medium is water or an organic solvent for an epoxy resin.

* * * * *